United States Patent
Medina et al.

(10) Patent No.: US 8,555,486 B1
(45) Date of Patent: Oct. 15, 2013

(54) METHOD FOR PROVIDING A POLE IN A MAGNETIC RECORDING TRANSDUCER USING A CATHODIC ETCH

(75) Inventors: Jose A. Medina, Pleasanton, CA (US); Tiffany Yun Wen Jiang, San Francisco, CA (US); Ming Jiang, San Jose, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 6 days.

(21) Appl. No.: 13/312,932

(22) Filed: Dec. 6, 2011

(51) Int. Cl.
*G11B 5/127* (2006.01)
*H04R 31/00* (2006.01)

(52) U.S. Cl.
USPC ........... 29/603.16; 29/603.13; 29/603.14; 29/603.15; 29/603.18; 216/22; 216/39; 216/40; 360/324.1; 360/324.11; 360/324.2; 360/324.12; 451/5; 451/41

(58) Field of Classification Search
USPC ........... 29/603.07, 603.08, 603.11–603.16, 29/603.18; 216/22, 39, 40; 360/324.1, 360/324.11, 324.2, 324.12; 451/5, 41
See application file for complete search history.

(56) References Cited

U.S. PATENT DOCUMENTS

| | | | |
|---|---|---|---|
| 7,523,550 B2 * | 4/2009 | Baer et al. | 29/852 |
| 8,248,728 B2 * | 8/2012 | Yamaguchi et al. | 360/125.09 |
| 8,289,649 B2 * | 10/2012 | Sasaki et al. | 360/125.13 |
| 2010/0163422 A1 | 7/2010 | Hsiao et al. | |

* cited by examiner

*Primary Examiner* — Paul D Kim (57) ABSTRACT

A method for fabricating a magnetic recording transducer is described. The transducer has an ABS location and a nonmagnetic intermediate layer having a pole trench. The method includes depositing at least one magnetic pole layer having a top surface and a pole tip portion proximate to the ABS location. A first portion of the magnetic pole layer(s) resides in the pole trench. The magnetic pole layer(s) have a seam in the pole tip portion that extends to the top surface. The method also includes cathodically etching a second portion of the magnetic pole layer(s) from the seam at a rate of not more than 0.1 nanometers/second, thereby forming a seam trench in the magnetic pole layer(s). The method also includes refilling the seam trench with at least one magnetic refill layer. At least an additional magnetic pole layer is deposited on the top surface and the magnetic refill layer(s).

19 Claims, 8 Drawing Sheets

ABS Location

METHOD FOR PROVIDING A POLE IN A MAGNETIC RECORDING TRANSDUCER USING A CATHODIC ETCH

BACKGROUND

Figure 1:
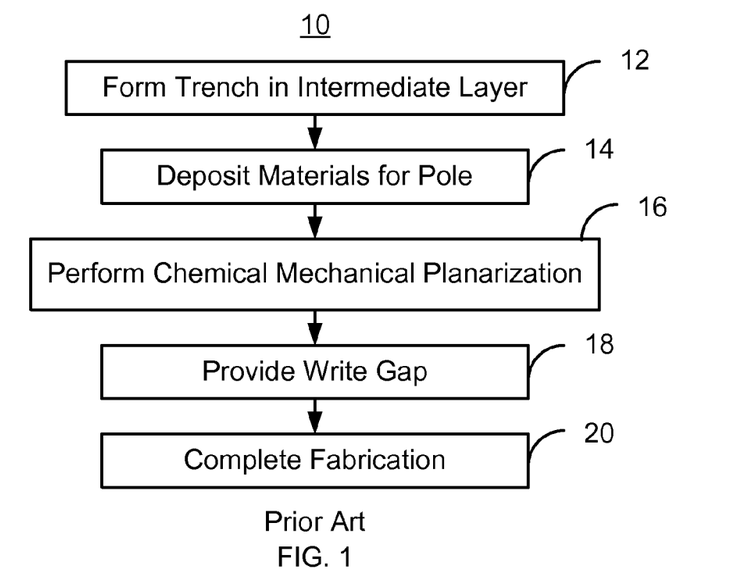
FIG. 1 is a flow chart depicting a conventional method for fabricating a side shield.
Figure 2:
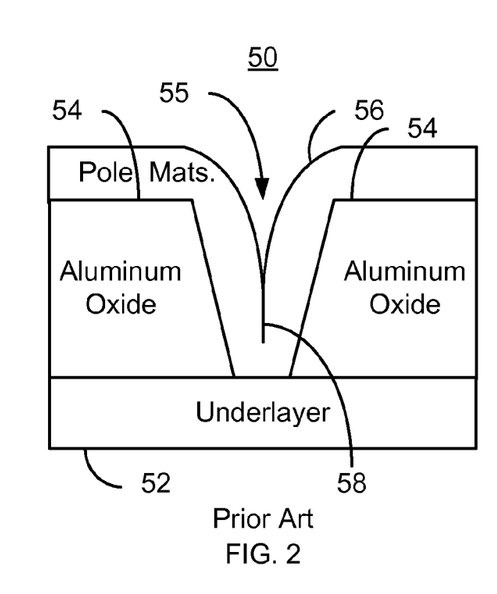
FIGS. 2-3 are diagrams depicting an ABS view of a conventional magnetic transducer.
Figure 3:
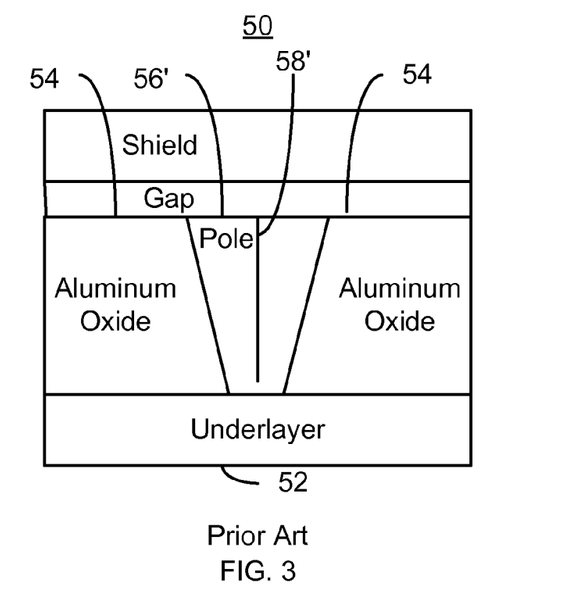

Conventional magnetic recording heads can be fabricated in a number of ways. FIG. 1 is a flow chart depicting a conventional method 10 for fabricating a PMR transducer using a conventional process. For simplicity, some steps are omitted. The method 10 starts after an intermediate layer has been formed. The intermediate layer is typically aluminum oxide. FIGS. 2-3 are diagrams a depicting conventional write transducer 50 as viewed from the air-bearing surface (ABS) during fabrication. The conventional PMR transducer 50 may be part of a coupled with a slider to form a PMR head. In addition, a read transducer (not shown) may be included to form a merged PMR head. For simplicity, only a portion of the conventional PMR transducer 50 is shown. The conventional method 10 is described in the context of the conventional PMR transducer 50.

A trench is formed in the intermediate layer, via step 12. Step 12 is typically performed using an alumina reactive ion etch (RIE). The top of the trench is typically wider than the trench bottom. In addition, the trench typically extends through the aluminum oxide layer. As a result, the PMR pole formed therein will have its top surface wider than its bottom. Consequently, the sidewalls of the pole will have a reverse angle.

The conventional pole materials are plated, via step 14. FIG. 2 depicts the conventional transducer 50 during step 14. The transducer 50 includes an underlayer 52 and an aluminum oxide layer 54 that is the intermediate layer. A trench 55 has been formed in the aluminum oxide layer 54. Also shown are the pole materials 56 being plated in step 14. The plating process of step 14 is substantially conformal. Thus, the magnetic pole materials 56 grow inwards from the edges of the trench 55 in the pole tip region, near the ABS. As a result, the outer surface of the pole materials 56 meet at a seam 58, filling the portion of the trench 55 in the pole tip. This is shown in FIG. 2. Because the trench 55 widens away from the ABS, in the yoke region (not shown), the remainder of the trench fills from the bottom toward the top of the trench 55.

After the pole material(s) have been provided, a chemical mechanical planarization (CMP) is performed, via step 16. As a result, the portion of the pole materials 56 outside of the trench 55 is removed. A write gap is provided, via step 18. Fabrication of the conventional transducer 50 may then be completed, via step 20. Thus, FIG. 3 depicts the conventional transducer 50 after step 16 has been performed. Thus, the conventional pole 56' having seam 58' has been formed.

Although the conventional method 50 can be used to form the conventional transducer 50, there are drawbacks. The conventional pole 56' may be subject to corrosion. As a result, the yield of the conventional method 50 may be less than desired. Further, the reliability of the conventional transducer may be poorer than desired.

Accordingly, what is needed is an improved method for fabricating a pole of transducer.

SUMMARY

A method for fabricating a magnetic recording transducer is described. The transducer has an ABS location and a nonmagnetic intermediate layer having a pole trench therein. The method includes depositing at least one magnetic pole layer having a top surface and a pole tip portion proximate to the ABS location. A first portion of the magnetic pole layer(s) reside in the pole trench. The magnetic pole layer(s) have a seam in the pole tip portion that extends to the top surface of the magnetic pole layer(s). The method also includes cathodically etching a second portion of the magnetic pole layer(s) from the seam at a rate of not more than 0.1 nanometers/second, thereby forming a seam trench in the magnetic pole layer(s). The method also includes refilling the seam trench with at least one magnetic refill layer. At least an additional magnetic pole layer is deposited on the top surface of the magnetic pole layer(s) and the magnetic refill layer(s).

DETAILED DESCRIPTION OF THE PREFERRED EMBODIMENTS

Figure 4:
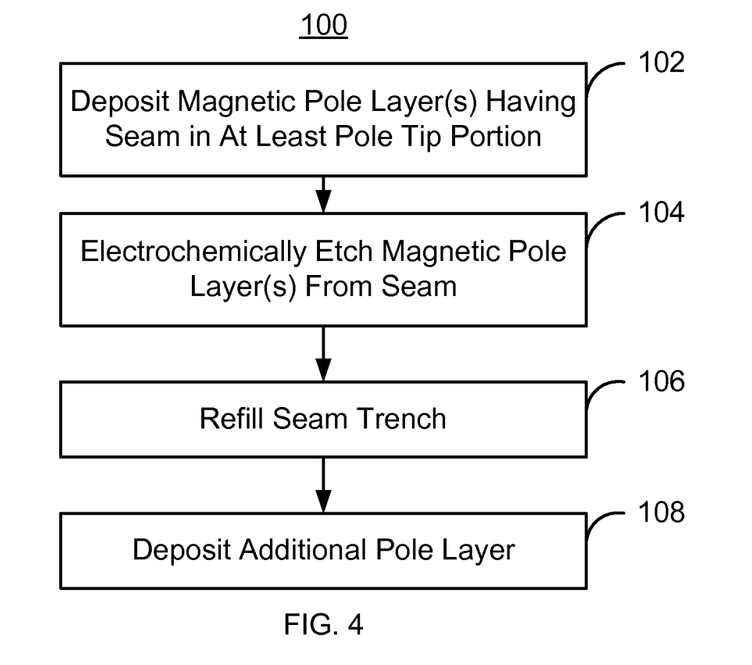
FIG. 4 is a flow chart depicting an exemplary embodiment of a method for fabricating a pole for a magnetic recording transducer.

FIG. 4 is a flow chart depicting an exemplary embodiment of a method 100 for fabricating a transducer. The method 100 is may be used in fabricating transducers such as PMR or energy assisted magnetic recording (EAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 is described in the context of forming a single transducer. However, the method 100 may be used to fabricate multiple transducers at substantially the same time. The method 100 and system are also described in the context of particular layers. However, in some embodiments, such layers may include multiple sub-layers.

The method 100 also may commence after formation of other portions of the magnetic recording transducer. For example, the method 100 may start after the underlayer and intermediate layer are fabricated. The method 100 also starts after a pole trench has been formed in the intermediate layer. The pole trench may be formed in various manners including but not limited to removal of a portion of the intermediate layer or a mask, deposition of the intermediate layer, and lift-off of the mask. The pole trench has the desired profile and location of the pole being formed. In some embodiments, the intermediate layer is an aluminum oxide layer. The nonmagnetic underlayer as well as the pole may reside on another underlayer. Further, in some embodiments, a leading edge shield is desired. In such embodiments, the leading edge shield may be provided under the underlayer. The leading edge shield is generally ferromagnetic, magnetically soft, and may include materials such as NiFe. In some embodiments, a seed layer is also provided. The seed layer for the pole may be magnetic or nonmagnetic. Further, an air-bearing surface location (ABS location) marks the surface at which the air-bearing surface (ABS) will reside.

At least one magnetic pole layer is deposited, via step 102. In some embodiments, step 102 includes plating the magnetic material(s) for the pole. Prior to or as part of step 102, seed layer(s) for the magnetic pole layer(s) may be provided. In some embodiments, the magnetic pole layer(s) include $CO_{35}Ni_4Fe_{61}$ and/or $Co_{37}Fe_{63}$. However, other materials and/or other stoichiometries may be used. For example, $Co_{43-29}Ni_{2-5}Fe_{55-65}$ and/or $Co_{45-20}Fe_{55-80}$ might be used. The magnetic pole layer(s) may also have a saturation magnetization of 2.3 T or more. The magnetic pole layer(s) have a top surface and a pole tip portion proximate to the ABS location. At least part of the magnetic pole layer(s) are in the pole trench. In addition, the magnetic pole layer(s) provided in step 102 having a seam in the pole tip portion. This seam extends to the top surface of the magnetic pole layer(s). The deposition in step 102 may be substantially conformal. Thus, the magnetic pole layer(s) may grow in from the sides of the trench in the pole tip region. The seam in the magnetic pole layer(s) may correspond to the physical bond formed as the top surfaces of the magnetic pole layer(s) meet in the pole tip region of the pole trench.

A portion of the magnetic pole layer(s) are electrochemically etched from the seam, via step 104. Electrochemically etching from the seam may include anodically (negative current) and/or cathodically (positive current) etching the magnetic pole layer(s). In some embodiments, the etch rate is not more than one nanometer/second. In some such embodiments, for example, where greater control is desired, the etch rate is not more than 0.1 nanometer/second. Such an etch rate may be achievable through a cathodic etch. Cathodically etching the magnetic pole layer(s) may be performed by applying a cathodic etching current to the magnetic pole layer(s) while they reside in a plating solution. The plating solution may be the same plating solution that is used for depositing the magnetic pole layer(s) in step 102. The cathodic etching current is configured such that the portion of the magnetic pole layer(s) is removed. In such embodiments, the magnetic pole layer(s) are plated at a cathodic current that is greater than the cathodic etching current. For example, the magnetic pole layer(s) may be plated in step 102 using a cathodic current density of at least 2 mA/cm$^2$ and not more than 10 mA/cm$^2$. In some such embodiments, the cathodic current density for plating is 3.3 mA/cm$^2$. In some embodiments, the cathodic etching current density is greater than zero and not more than 0.6 mA/cm$^2$. In some such embodiments, the cathodic etching current is 0.15 mA/cm$^2$. Thus, the cathodic current used in step 102 adds material to the magnetic pole layer(s), while the cathodic etching current used in step 104 removes material from the magnetic pole layer(s). Step 104 thus forms a seam trench in the magnetic pole layer(s). This seam trench includes the location of the seam. In some embodiments, the seam trench has a width of not more than fifteen nanometers. In some such embodiments, the width of the seam trench is at least five nanometers and not more than seven nanometers.

The seam trench is refilled using at least one magnetic refill layer, via step 106. In some embodiments, step 106 includes plating the magnetic refill layer(s). Thus, step 106 may include using another cathodic current greater than the cathodic etching current. The same plating bath may also be used in step 106. In some embodiments, the cathodic current density used in step 106 may be at least 1 mA/cm$^2$ and not more than 2 mA/cm$^2$. In some such embodiments, the cathodic current density in step 106 is 1.5 mA/cm$^2$. The magnetic refill layer may include $Co_{76-27}Ni_{4-12}Fe_{20-61}$ and/or $Co_{80-50}Fe_{20-50}$. In some embodiments, the magnetic refill layer includes $Co_{61}Ni_9Fe_{30}$ and/or $Co_{68}Fe_{32}$. The magnetic refill layer(s) may have a saturation magnetization of at least 2.0 T.

At least an additional magnetic pole layer is deposited, via step 108. The additional magnetic pole layer(s) reside on the top surface of the magnetic pole layer(s) formed in step 102 and the magnetic refill layer fabricated in step 106. Step 108 may include plating the additional magnetic pole layer(s). In some embodiments, this plating may occur at an additional cathodic current greater than the cathodic etching current. For example, the additional magnetic pole layer(s) may be plated in step 108 using a cathodic current density of at least 2 mA/cm$^2$ and not more than 10 mA/cm$^2$. In some such embodiments, the cathodic current density for plating is 3.3 mA/cm$^2$. Thus, the additional magnetic pole layer(s) may include $Co_{43-29}Ni_{2-5}Fe_{55-65}$. In some such embodiments, the additional magnetic pole layer(s) include $Co_{35}Ni_4Fe_{61}$. The additional magnetic pole layer(s) may thus have a saturation magnetization of at least 2.3 T. Fabrication of the pole and the transducer may then be completed. For example, the pole may be planarized and other structures such as shields and/or coils may be formed.

Figure 5:
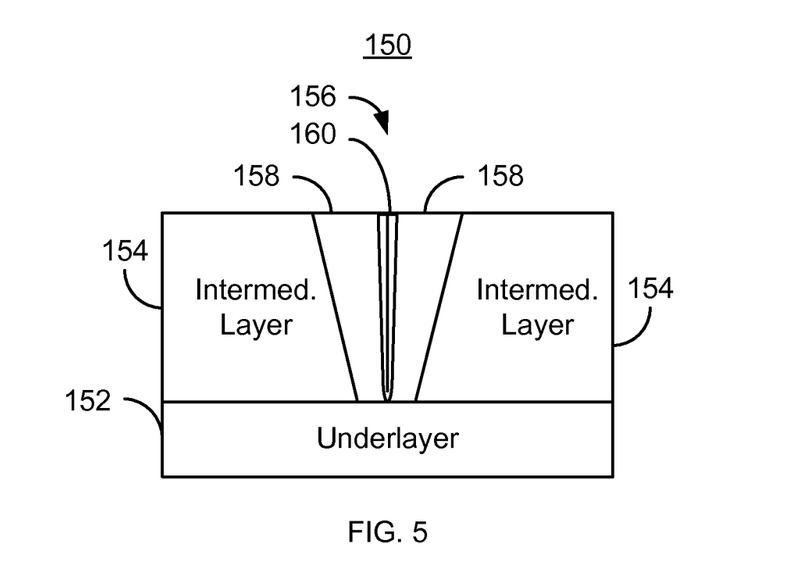
FIG. 5 is a diagram depicting an exemplary embodiment of a magnetic recording transducer.

FIG. 5 is a diagram depicting an exemplary embodiment of a portion of a magnetic transducer 150 having a pole formed using the method 100. In particular, an ABS view is shown. For clarity, FIG. 5 is not to scale. The magnetic transducer 150 may be part of a merged heat that includes at least one read transducer (not shown) in addition to at least one magnetic transducer 150. The magnetic transducer 150 includes an underlayer 152, which may reside on a bottom shield (not shown). Also included are a nonmagnetic layer 154 and pole 156. The pole 156 includes one or more magnetic layers 158 that are deposited, for example via plating in step 102. In place of the seam, a seam trench was formed in step 104 using the cathodic etch. Thus, the magnetic refill layer(s) 160 that fill the seam trench are shown.

Using the method 100, the pole 156 may be formed. It has been determined that the seam line 58' depicted in FIG. 3 is a source of corrosion. Removal of the seam in step 104 reduces the susceptibility of the transducer 100 to corrosion. Seam removal can be accomplished using an anodic current and/or the cathodic etching current that has a slow removal rate. The formation of the seam trench may be performed in a controlled manner. Thus, a relatively small amount of the high saturation magnetization material may be removed. In addition, the refill in step 106 may be performed such that the corrosion resistance and magnetic properties of the refill material used are optimized. Consequently, even if a seam does exist in the refill materials 160, corrosion is mitigated or prevented. Other advantages might be achieved by the use of another material to refill the seam trench. Further, the additional magnetic material(s) deposited in step 108, which may fill the yoke, can have a high saturation magnetization. Thus, corrosion resistance may be improved while limiting the adverse effects on the magnetic properties of the pole 156. As steps 102, 104, 106, and 108 may be accomplished by varying the cathodic current and/or the addition of an anodic current, the removal and refill of the seam may be performed while the transducer remains in a plating bath. Thus, the improvement in corrosion resistance may be achieved without substantially complicating fabrication of the transducer 150.

Figure 6:
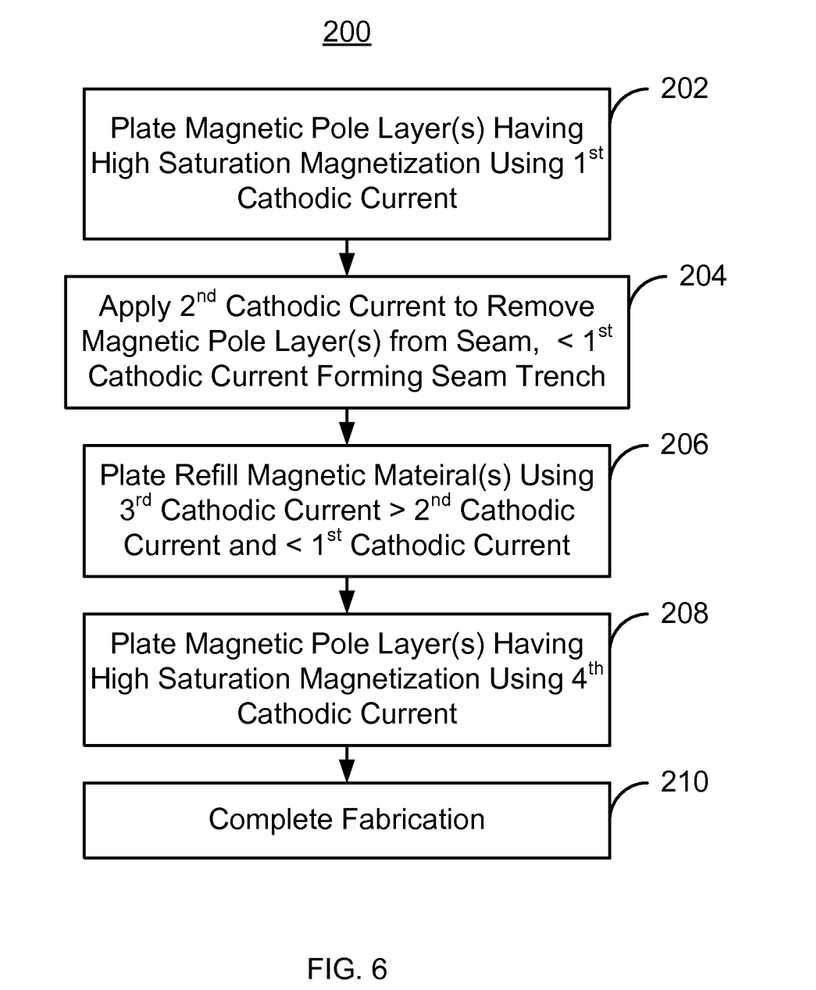
FIG. 6 is a flow chart depicting another exemplary embodiment of a method for fabricating a magnetic recording transducer.

FIG. 6 is a flow chart depicting another exemplary embodiment of a method 200 for fabricating a PMR transducer. For simplicity, some steps may be omitted. FIGS. 7-21 are diagrams depicting ABS location, side, and plan views of an exemplary embodiment of a portion of a transducer during 250 fabrication. For clarity, FIGS. 7-21 are not to scale. Although FIGS. 7-21 depict the ABS location (location at which the ABS is to be formed) and ABS at a particular point in the pole, other embodiments may have other locations for the ABS. Referring to FIGS. 5-21, the method 200 is described in the context of the transducer 250. However, the method 200 may be used to form another device (not shown). The transducer 250 being fabricated may be part of a merged head that also includes a read head (not shown in FIGS. 6-20) and resides on a slider (not shown) in a disk drive. The method 200 also may commence after formation of other portions of the transducer 250. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

The method 200 also commences after formation of other portions of the magnetic recording transducer. For example, the method 200 may start after the underlayer, intermediate layer, and pole trench in the intermediate layer are fabricated. The pole trench has the desired profile and location of the pole being formed. In some embodiments, the intermediate layer is an aluminum oxide layer. The nonmagnetic underlayer as well as the pole may reside on other layer(s). Further, in some embodiments, a leading edge shield is desired. In such embodiments, the leading edge shield may be provided under the underlayer.

Figure 7:
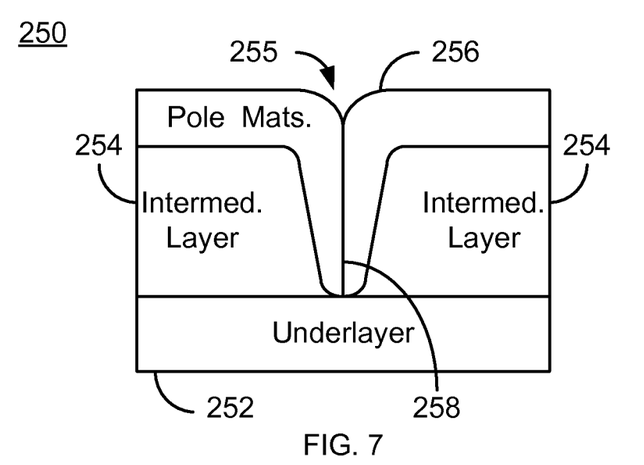
FIGS. 7-21 are diagrams depicting an exemplary embodiment of a magnetic recording transducer during fabrication.
Figure 8:
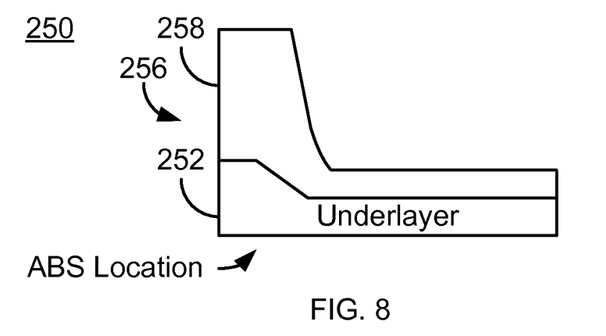
Figure 9:
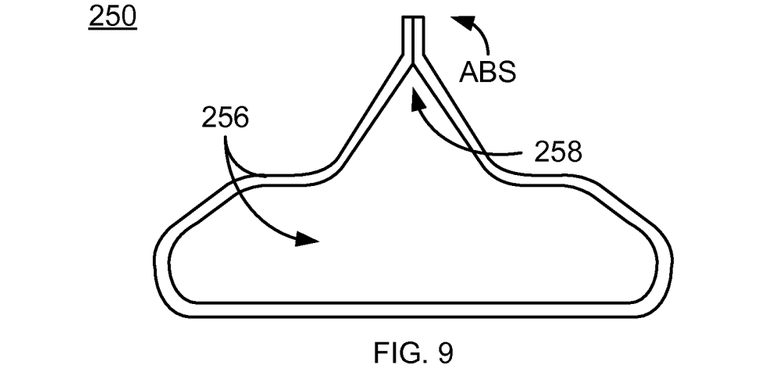

At least one magnetic pole layer is plated in a plating bath using a first cathodic current, via step 202. In some embodiments, step 202 includes using a first cathodic current density of at least 2 mA/cm$^2$ and not more than 10 mA/cm$^2$. In some such embodiments, the first cathodic current density is 3.3 mA/cm$^2$. Prior to or as part of step 202, seed layer(s) for the magnetic pole layer(s) may be provided. The magnetic pole layer(s) plated in step 202 may be $Co_{43-29}Ni_{2-5}Fe_{55-65}$. In some embodiments, the magnetic pole layers are $Co_{35}Ni_4Fe_{61}$ having a saturation magnetization of 2.3 T or more. However other stoichiometries and/or other materials might be used. FIGS. 7-9 depict ABS, side, and plan views of the transducer 250 after step 202 is performed. The transducer thus includes an underlayer 252, and intermediate layer 254 that may be aluminum oxide having a pole trench 255 therein. Also shown is the magnetic pole layer 256. As can be seen in FIGS. 7-9, the magnetic pole layer(s) 256 have a seam 258 in the pole tip proximate to the ABS because of the changing width and depth of the pole trench 255 and the conformal nature of the deposition. However, because pole trench 255 is wider in the yoke region distal from the ABS, the yoke region is only partially filled. This is shown by the edge of the pole material(s) 256 depicted in FIG. 9. As can be seen in FIG. 7, the seam 258 extends to the top surface of the magnetic pole layer(s) and may extend to the bottom of the trench 255. The deposition in step 102 may be substantially conformal.

Figure 10:
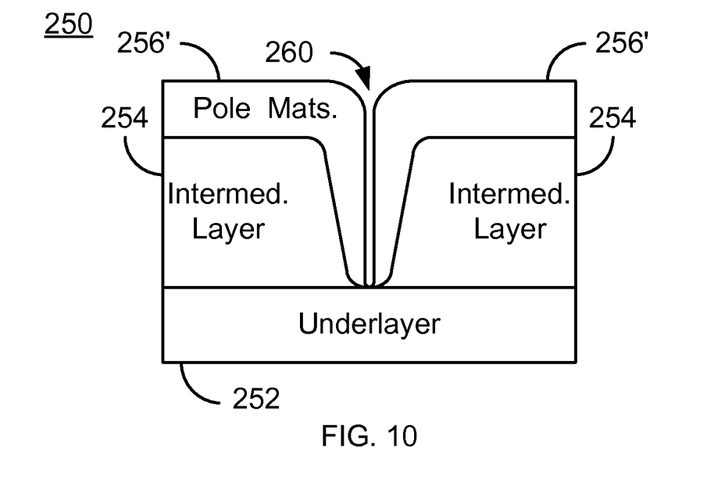
Figure 11:
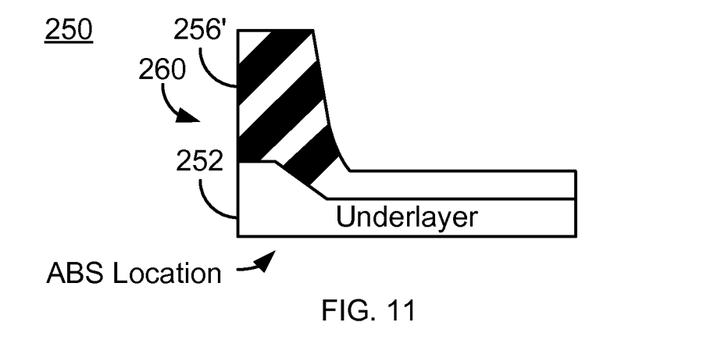
Figure 12:
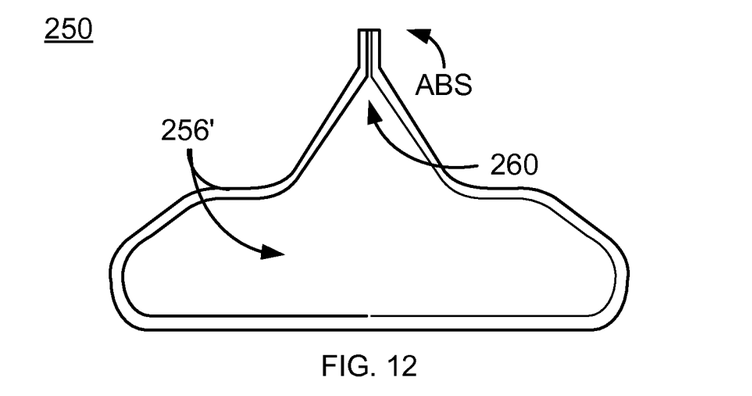

A portion of the magnetic pole layer(s) are cathodically etched from the seam 258 in the same plating bath and using a second cathodic current, via step 204. The second cathodic current is a cathodic etch current. In some embodiments, the etch rate is not more than 0.1 nanometers/second. However, other etch rates may be used. Thus, the second cathodic current results in removal of some of the material deposited in step 202. In some embodiments, the second cathodic current density is greater than zero and not more than 0.6 mA/cm$^2$. In some embodiments, the second cathodic current density is 0.15 mA/cm$^2$. FIGS. 10-12 depict ABS, side, and plan views of the transducer 250 after step 204 is performed. The seam 258 has been removed. Instead, a seam trench 260 has been formed. In the side view, the seam trench 260 is shown by cross-hatching. In some embodiments, the seam trench 260 has a width of not more than fifteen nanometers. In some such embodiments, the width of the seam trench 260 is at least five nanometers and not more than seven nanometers.

Figure 13:
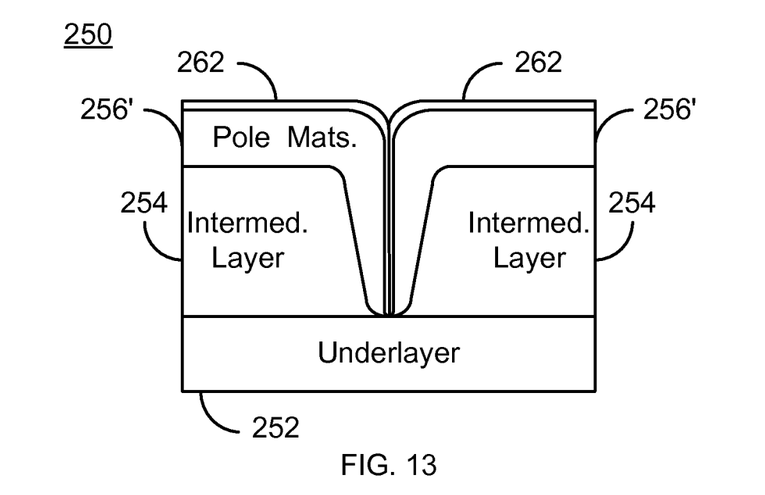
Figure 14:
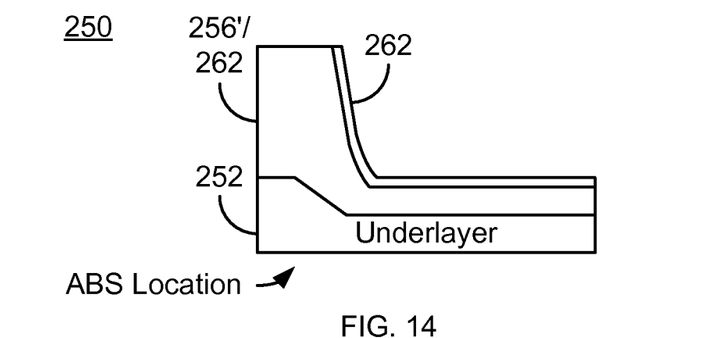
Figure 15:
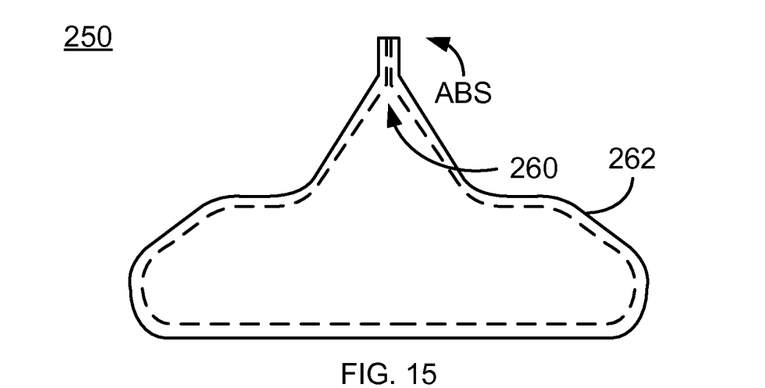
Figure 16:
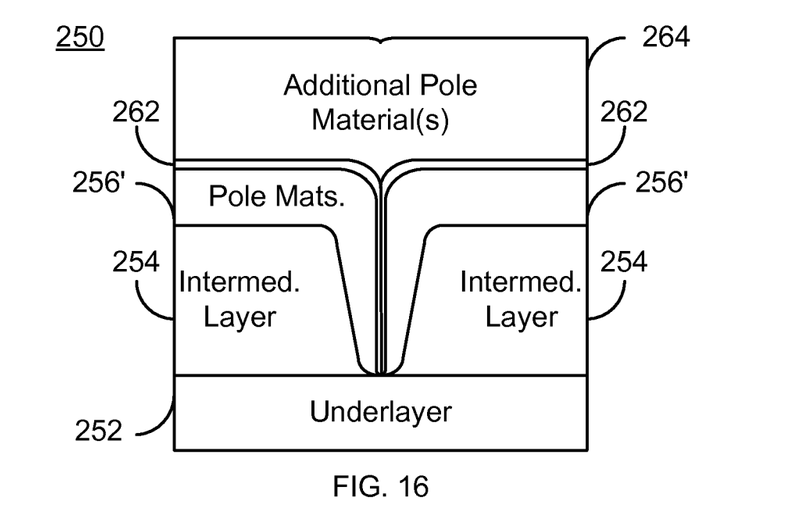
Figure 17:
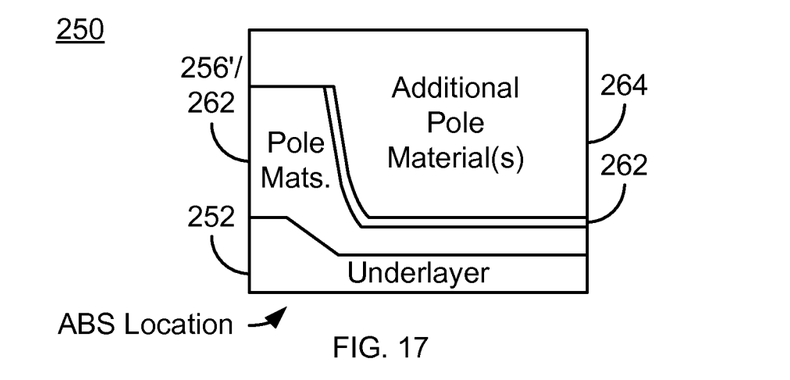
Figure 18:
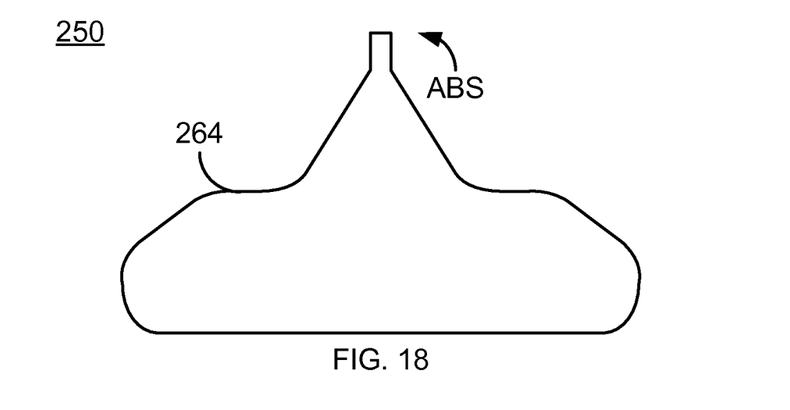

The seam trench 260 is refilled by plating at least one magnetic refill layer using a third cathodic current, via step 206. The third cathodic current is greater than the second cathodic current. The same plating bath may also be used in step 206 as used in step(s) 202 and 204. The third cathodic current may be driven using a third cathodic current density is at least 1 mA/cm$^2$ and not more than 2 mA/cm$^2$. In some such embodiments, the third cathodic current density is 1.5 mA/cm$^2$. FIGS. 13-15 depict ABS, side, and plan views of the transducer 250 after step 206 is performed. Thus, a magnetic refill layer 262 is shown. The magnetic refill layer 262 may include $Co_{76-27}Ni_{4-12}Fe_{20-61}$. In some embodiments, the magnetic refill layer 262 includes $Co_{61}Ni_9Fe_{30}$. However, in other embodiments, other stoichiometries and/or other materials may be used. The magnetic refill layer may have a saturation magnetization of at least 2.0 T. As can be seen in FIG. 14, the magnetic refill layer 262 does not fill the yoke portion of the pole trench. However, the magnetic refill layer 262 may cover the pole material(s) 256' in the yoke region. Thus, the side edges of the pole material(s) 256' and the seam trench 260 are shown by a dashed line in FIG. 15.

Figure 19:
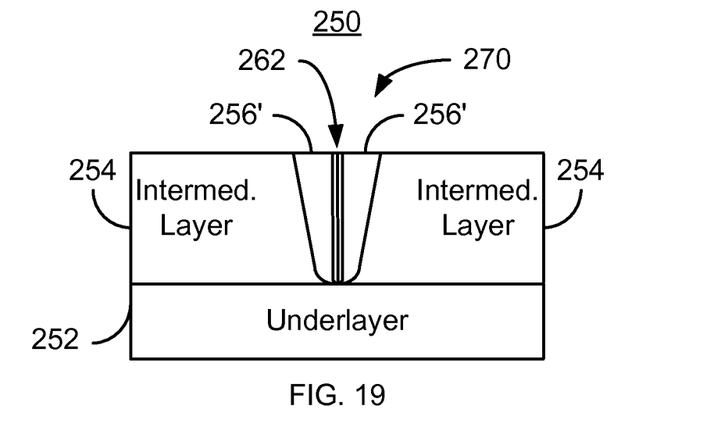
Figure 20:
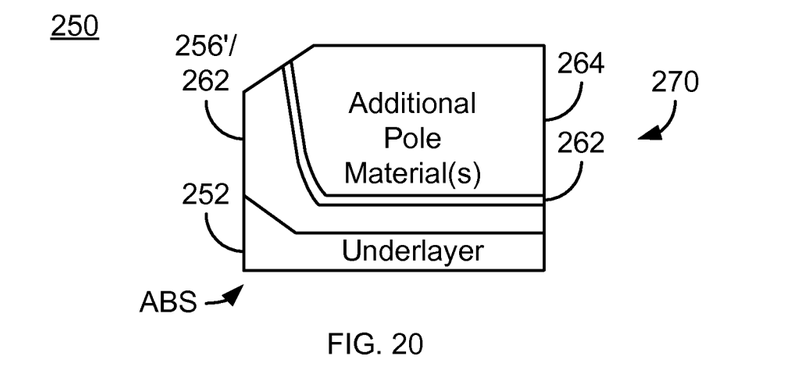
Figure 21:
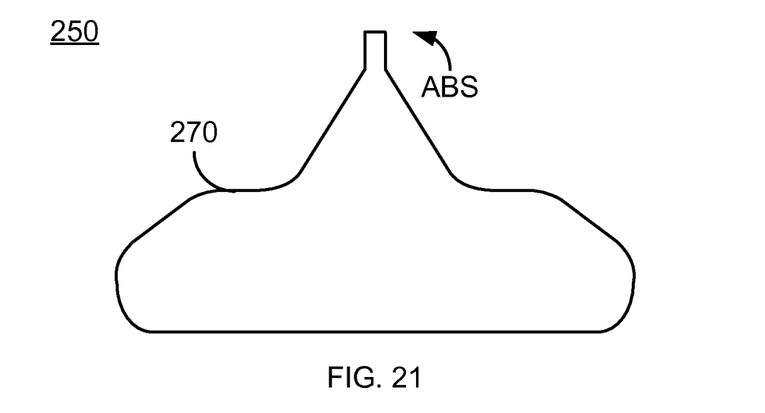

At least an additional magnetic pole layer is plated using a fourth cathodic current, via step 208. The additional magnetic pole layer(s) reside on the top surface of the magnetic pole layer(s) formed in step 202 and the magnetic refill layer fabricated in step 206. The third cathodic current may be driven using a third cathodic current density of at least 2 mA/cm$^2$ and not more than 10 mA/cm$^2$. In some such embodiments, the third cathodic current density is 3.3 mA/cm$^2$. In some embodiments, the first cathodic current and the third cathodic current are the same. FIGS. 15-18 depict ABS, side, and plan views of the transducer 250 after step 208 is performed. Thus, the additional magnetic pole layer(s) 264 are shown. The additional magnetic pole layer 264 is $Co_{43-29}Ni_{2-5}Fe_{55-65}$. In some such embodiments, the additional magnetic pole layer 264 is $Co_{35}Ni_4Fe_{61}$ and has a saturation magnetization of at least 2.3 T. However, in other embodiments, other stoichiometries and/or other material(s) may be used for the additional magnetic pole layer 264. Fabrication of the pole and the transducer may then be completed, via step 210. For example, the pole may planarized, bevel(s) formed, and other structures such as shields and/or coils may be formed. FIGS. 19-21 depict ABS, side, and plan views of the transducer 250 after additional steps have been performed. Thus, the portion of the pole material 256 has been removed and a trailing edge bevel formed in the pole 270.

Using the method 200, the pole 270 may be formed. Removal of the seam 258 and use of more corrosion resistant refill material(s) 262 may mitigate or eliminate corrosion. Other advantages might be achieved by the use of another material to refill the seam trench 260. Use of additional high saturation magnetization pole materials 264 limits the adverse effects on the magnetic properties of the pole 270. As steps 202, 204, 206, and 208 may be accomplished by varying the cathodic current, the removal and refill of the seam may be performed while the transducer remains in a plating bath. Thus, the improvement in corrosion resistance may be achieved without substantially complicating fabrication of the transducer 250.

We claim:

1. A method for fabricating a magnetic recording transducer having an ABS location and an intermediate layer having a pole trench therein, the intermediate layer being nonmagnetic, the method comprising:
   depositing at least one magnetic pole layer having a top surface and a pole tip portion proximate to the ABS location, a first portion of the at least one magnetic pole layer residing in the pole trench, the at least one magnetic pole layer having a seam in the pole tip portion and extending to the top surface of the at least one magnetic pole layer;
   electrochemically etching a second portion of the at least one magnetic pole layer from the seam, forming a seam trench therein;
   refilling the seam trench with at least one magnetic refill layer; and
   depositing at least an additional magnetic pole layer on the top surface of the at least one magnetic pole layer and the at least one magnetic refill layer.

2. The method of claim 1 wherein the step of electrochemically etching the second portion of the at least one magnetic pole layer further includes:
   cathodically etching the second portion of the at least one magnetic pole layer.

3. The method of claim 2 wherein the step of cathodically etching the second portion of the magnetic pole layer is performed at a rate of not more than 0.1 nanometers/second.

4. The method of claim 2 wherein the step of cathodically etching further includes:
   applying a cathodic etching current to the at least one magnetic pole layer in a plating solution, the cathodic etching current being configured such that the second portion of the at least one magnetic pole layer is removed.

5. The method of claim 4 wherein the seam trench has a width of not more than fifteen nanometers.

6. The method of claim 5 wherein the width is at least five nanometers and not more than seven nanometers.

7. The method of claim 4 wherein the step of depositing the at least one magnetic pole layer further includes:
   plating the at least one magnetic pole layer in the plating solution at a cathodic current greater than the cathodic etching current.

8. The method of claim 7 wherein the at least one magnetic pole layer further includes $Co_{35}Ni_4Fe_{61}$.

9. The method of claim 7 wherein the at least one magnetic pole layer has a saturation magnetization of at least 2.3 T.

10. The method of claim 4 wherein the refilling the seam trench further includes:
    plating the at least one magnetic refill layer.

11. The method of claim 10 wherein the step of plating further includes:
    plating the at least one magnetic refill layer in the plating solution at a cathodic refill current greater than the cathodic etching current.

12. The method of claim 10 wherein the at least one additional magnetic refill layer further includes $Co_{76-27}Ni_{4-12}Fe_{20-61}$.

13. The method of claim 12 wherein the at least one additional magnetic refill layer further includes $Co_{61}Ni_9Fe_{30}$.

14. The method of claim 10 wherein the at least one additional magnetic refill layer has a saturation magnetization of at least 2.0 T.

15. The method of claim 4 wherein the step of depositing the at least one additional magnetic pole layer further includes:
    plating the at least one additional magnetic pole layer in the plating solution at an additional cathodic current greater than the cathodic etching current.

16. The method of claim 15 wherein the at least one magnetic pole layer further includes $Co_{43-29}Ni_{2-5}Fe_{55-65}$.

17. The method of claim 15 wherein the at least one magnetic pole layer further includes $Co_{35}Ni_4Fe_{61}$.

18. The method of claim 15 wherein the at least one magnetic pole layer has a saturation magnetization of at least 2.3 T.

19. A method for fabricating a magnetic recording transducer having an ABS location and an intermediate layer having a pole trench therein, the intermediate layer being nonmagnetic, the method comprising:
    plating at least one magnetic pole layer in a plating solution at a first cathodic current, the at least one magnetic pole layer having a top surface and a pole tip portion, a first portion of the at least one magnetic pole layer residing in the trench, the at least one magnetic pole layer having a seam in the pole tip portion extending to the top surface of the at least one magnetic pole layer, the at least one magnetic pole layer further including $Co_{35}Ni_4Fe_{61}$ and having a saturation magnetization of at least 2.3 T;
    applying a second cathodic current to the at least one magnetic pole layer in the plating solution to cathodically etch a second portion of the at least one magnetic pole layer from the seam at a rate of not more than 0.1 nanometers/second and form a seam trench therein, the second cathodic current being less than the first cathodic current;
    plating at least one magnetic refill layer in the plating solution at a third cathodic current, the at least one magnetic refill layer configured to refill the seam trench, the at least one additional magnetic refill layer further including $Co_{61}Ni_9Fe_{30}$ and having a refill saturation magnetization of at least 2.0 T, the third cathodic current being greater than the second cathodic current and less than the first cathodic current; and
    plating at least an additional magnetic pole layer in the plating bath at a fourth cathodic current, the fourth cathodic current being substantially the same as the first cathodic current, the additional magnetic pole layer residing layer on at least the top surface of the at least one magnetic pole layer and the magnetic refill layer, the at least one additional magnetic pole layer further including the $Co_{35}Ni_4Fe_{61}$ and having the saturation magnetization of at least 2.3 T.

* * * * *